April 29, 1969     A. G. STIMSON ET AL     3,440,938
AUTOMATIC EXPOSURE CONTROL FOR PHOTOFLASH
Filed Dec. 8, 1965     Sheet 1 of 3

ALLEN G. STIMSON
JOHN H. EAGLE
INVENTORS

ATTORNEYS

ALLEN G. STIMSON
JOHN H. EAGLE
INVENTORS

United States Patent Office 3,440,938
Patented Apr. 29, 1969

3,440,938
AUTOMATIC EXPOSURE CONTROL FOR
PHOTOFLASH
Allen G. Stimson and John H. Eagle, Rochester, N.Y.,
assignors to Eastman Kodak Company, Rochester, N.Y.,
a corporation of New Jersey
Filed Dec. 8, 1965, Ser. No. 512,436
Int. Cl. G01j 1/42
U.S. Cl. 95—10                                    4 Claims

ABSTRACT OF THE DISCLOSURE

A camera shutter control mechanism automatically operated with a photoflash apparatus. The shutter mechanism is controlled by a moving coil permanent magnet galvanometer powered by a capacitor discharge. The capacitor discharge is regulated by a photoresistive element which is responsive to scene light and the light provided by the photoflash apparatus.

---

This invention relates to photographic cameras and more particularly, to photographic cameras with shutter systems to be operated automatically with a photoflash system.

Presently, many cameras have exposure controls to automatically or semi-automatically adjust exposure factors whenever a continuous light source is utilized. However, when using an instantaneous light source such as a flashbulb, it has been necessary to make use of a guide number determined from a table according to the particular film and lamp combination for a given shutter speed. Diaphragm aperture size is then derived by dividing the light-to-subject distance into the guide number. While this procedure is workable, it appears undesirable for many amateur photographers who do not have a good or rapid sense of mathematical computation. In addition, guide numbers for a flash lamp design are established according to a tested standard, from which the commercially available flash lamps can vary to a degree.

It has been discovered that a very fast operating electromechanical device is a moving-coil permanent magnet electric instrument powered by capacitor discharge. Thus, the present invention relates to the use of such instruments as photographic camera shutters by fixing suitable vanes to the moving coils.

An important object of the present invention, therefore resides in the provision of a photographic still camera operable automatically to control exposure of photosensitive film with timed photoflash by means of moving coil instruments.

Yet another object resides in the provision of an electrical circuit arrangement operable to automatically control exposure by limiting exposure time by a light controlled shutter and a pre-set exposure aperture size.

A more particular object resides in the configuration of a particular shutter control mechanism using moving coil galvanometers to automatically determine exposure time according to the actual brightness of the subject to be photographed.

Other objects and advantages will become apparent during the course of the following description, the accompanying drawing forming a part thereof and wherein.

Figure 1:
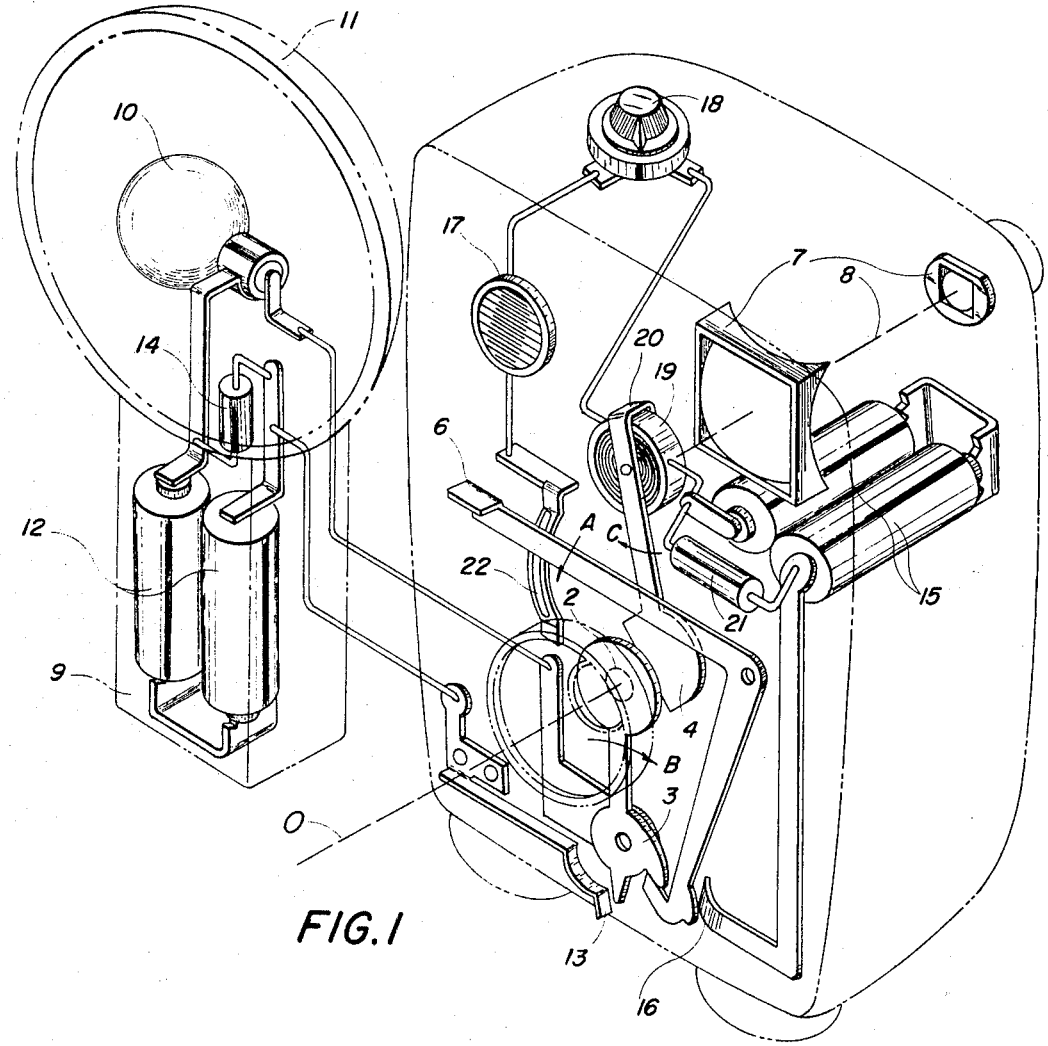
FIG. 1 is a partial perspective view of a camera showing elements of the invention and other camera parts cooperating therewith.
Figure 2:
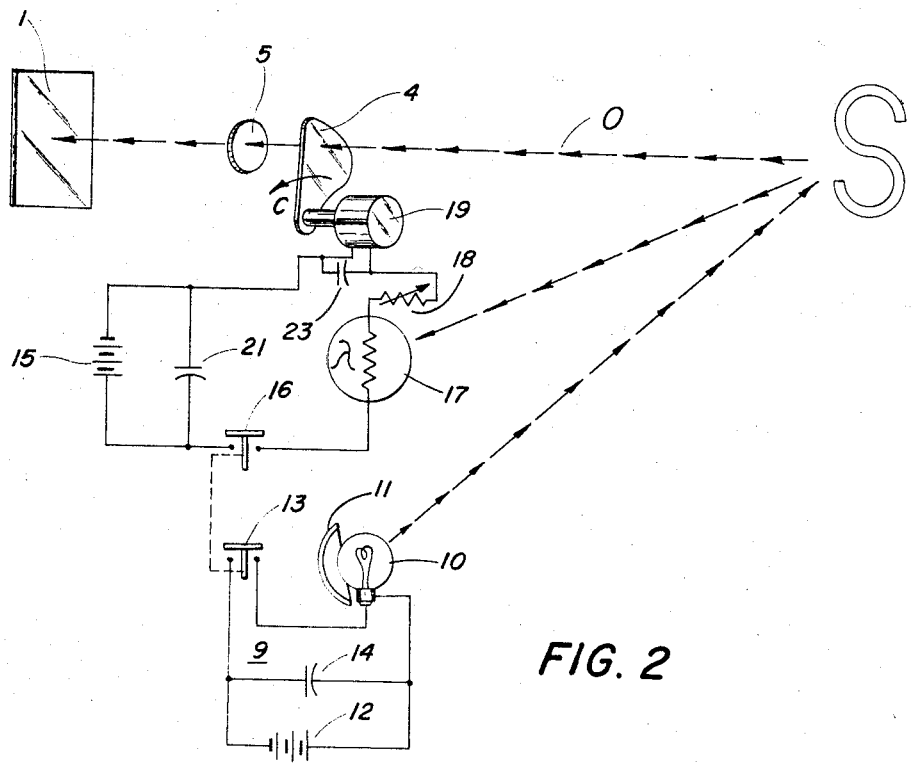
FIG. 2 is a schematic wiring diagram of the invention as shown in FIG. 1.

With reference to FIGS. 1 and 2, a typical photographic still camera embodying the present invention has an optical or exposure axis 0 on which are located a photosensitive surface 1, an exposure aperture 2 defined by a diaphragm in a known manner, a conventionally operating shutter mechanism 3, a closure shutter 4 according to the invention, and a focusing lens 5. Shutter 3 operates in a conventional manner upon depressing an accessible actuating member 6, and the diaphragm mechanism is constructed to provide a fixed or variable exposure aperture 2 in a known manner. A viewfinder 7 may be located on a second optical axis 8.

There is also provided a flash attachment 9, which is shown as a separable device, although it may form an integral part of the camera structure. The attachment 9 includes a lamp socket for detachably receiving a flash lamp or bulb 10 in front of a light reflector 11. The flash lamp 10 is electrically connected in series with a source of electrical potential 12 and a synchronizing switch 13 to ignite the flash lamp in timed relationship with the operation of camera shutter 3. An optional capacitor 14 may be electrically connected across the terminals of battery 12 to ensure a properly timed flash with a full electrical charge.

Within the camera proper as shown is a separate electrical series circuit comprising a source of electrical potential 15, a circuit actuating switch 16, a light responsive resistor or photoconductive cell 17 such as a cadmium sulfide cell, a variable resistor 18, and a moving coil galvanometer or electrical measuring instrument 19 which drives a moving member 20 such as a coil, and is electrically energized as a function of electrical current determined by the resistance of the photocell 17. Mounted integrally with the moving member 20 to move therewith about its axis of rotation is the closure shutter 4. When the photoresistive element 17 is exposed to light, its internal resistance is decreased, thereby enabling a greater electrical current to pass through the meter and cause the coil and shutter 4 to be moved to an aperture closing position when a predetermined high light value is reached. When the circuit is open, or the scene light on the photocell 17 is below a predetermined value such that its electrical resistance is high, the coil is disposed so that the closure shutter 4 is normally in an open position, i.e., spaced from the exposure aperture 2 as shown in FIG. 1.

A capacitor 21 of either the electrolytic type or the oil filled type is connected across the terminals of the electrical potential 15 to provide stored energy and rapid operation of the closure shutter 4 by instant response of the meter 19 thereto when the resistance of photocell 17 falls to the predetermined level.

Since the duration of a photoflash is 25 to 50 milliseconds, it becomes apparent that the exposure control must operate in about one millisecond in order to be effective. Because it is not possible to change magnetic flux or momentum instantaneously, an electromagnetic device should operate as a prime mover on constant magnet flux, and a moving coil galvanometer with minimum inertia meets this requirement. Considering, therefore, the calculated permissible inertia to operate the shutter in one millisecond, it was found that shutter times were readily controllable within limits when using a power source of minimum internal impedance and maximum energy for the duration required, i.e., the capacitor discharge.

In operation, the shutter 3 may be tensioned for release in a known manner, as by operation of the roll film winding mechanism to position an unexposed portion of film 1 on the optical axis 0. The shutter 3 is then released by pressing the actuating member 6 in the direction of the arrow shown in FIG. 1. Initially, line circuit switch 16 is closed, thereby completing the series circuit from the batteries 15 through the actuating member 6 and its spring contact 22 to photoresistive element 17 and the meter instrument 19. In timed relationship therewith, the flash lamp circuit is closed by closing of the shutter synchronizing switch 13, thereby firing the flash bulb to illuminate the subject S.

When the photosensitive resistor 17 detects an amount of light on subject S sufficient to have permitted proper film exposure, the resistance therein is accordingly reduced sufficiently to cause the capacitor 21, after a given time delay, to discharge rapidly and therefore cause moving coil 20 to be deflected and the attached closure shutter 4 to cover the exposure aperture 2, thereby terminating exposure before the conventional shutter 3 closes. Variable resistor 18 is shown here as a means to alter the circuit characteristics according to the speed of the particular photosensitive film used. Alternatively, it may be used for internal factory calibration or other purpose.

In addition, there is also provided an integrating capacitor 23 connected across the leads of meter 19 to give a further light integrating effect. In this case, operation of the closure shutter 4 would be delayed by the time required to charge the capacitor 23 according to the varying current integrated as determined by the varying resistance of the photoresistive element 17 prior to capacitor charge.

From the foregoing, it will be seen that proper exposure is provided automatically, and the operator need not concern himself in any way with computations based on the various guide numbers for the many available type flash bulbs. Similarly, a photographic camera according to the present invention can be adapted for use with any existing type of flash attachment.

Figure 3:
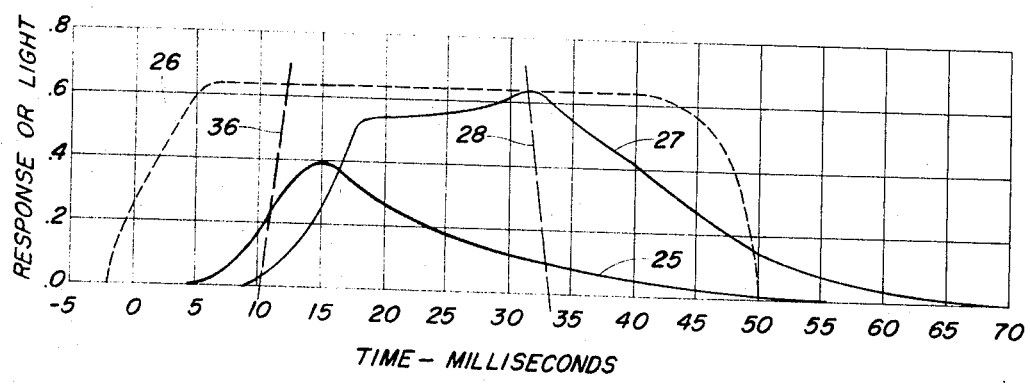
FIG. 3 is a characteristic curve diagram showing the relationship of the factors related to the present invention.

FIG. 3 graphically shows various physical time relationships which can be coordinated for operation of the present invention. The graph of FIG. 3 has a time scale oriented from time 0 when the shutter synchronizing switch 13 is closed. Curve 25 represents a typical flash lamp light output curve, curve 26 represents the time duration of conventional shutter 3, and 27 is a typical focal plane type flash lamp output curve. In coordinating these factors, the conventional shutter 3 starts to open at about −2 milliseconds and may be set to remain open for about 50 milliseconds as shown by curve 26. Light output from the fired flash bulb is commenced and varies in intensity as shown with respect to the output curve 25.

Timed with the opening of shutter 3 is the closing of circuit switch 16, which applies a full voltage of the capacitor 21 across the cell 17 and meter 19 at time zero. Until sufficient light reflected from subject S reaches the photocell 17, its resistance remains too high to permit sufficient current for capacitor discharge. However, as soon as a sufficient illumination is received, the photocell resistance decreases rapidly, thereby enabling capacitor 21 to discharge through the meter 19 and effect a closing of the closure shutter 4 to terminate exposure. This is indicated by the aperture cutoff line 28 shown at between 30–35 milliseconds for light curve 25.

The light output characteristics of the focal plane camera lamp shown by curve 27 might facilitate exposure control because of its relatively constant magnitude and longer time duration. In either case, however control is by reflected light, and the provision of the second capacitor 23 may effect a further light integrating effect to approximate total light received.

Thus, it becomes obvious that exposure control by the present invention is accomplished by varying the time of exposure according to subject brightness, with flash pictures being taken by variable exposure time and a fixed exposure aperture.

Figure 4:
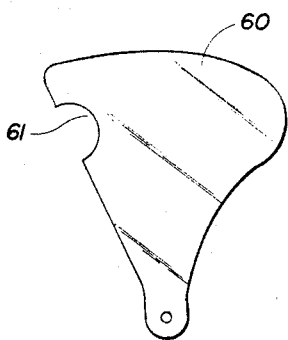
FIGS. 4 and 5 are alternative closure shutter configurations.
Figure 5:
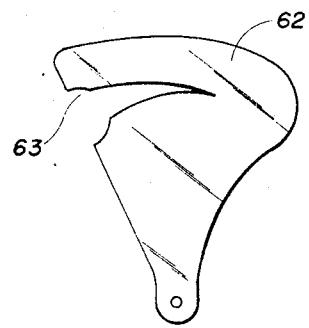

FIGURES 4 and 5 show alternative closure shutter shapes suitable for use in the present invention. For example, shutter 60 includes a semicircular cutout 61 equal in diameter to the exposure or lens aperture 2 at the flash exposure setting. The shutter 60 is then positioned in its normally open or non-energized state with the cutout 61 adjacent the aperture 2, thereby enabling a quicker closure response time for any given moving coil shutter arrangement.

The modified shutter 62 shown in FIG. 5 includes a tapered or shaped opening 63 as shown and is particularly suitable in cases where depth of field is important.

Figure 6:
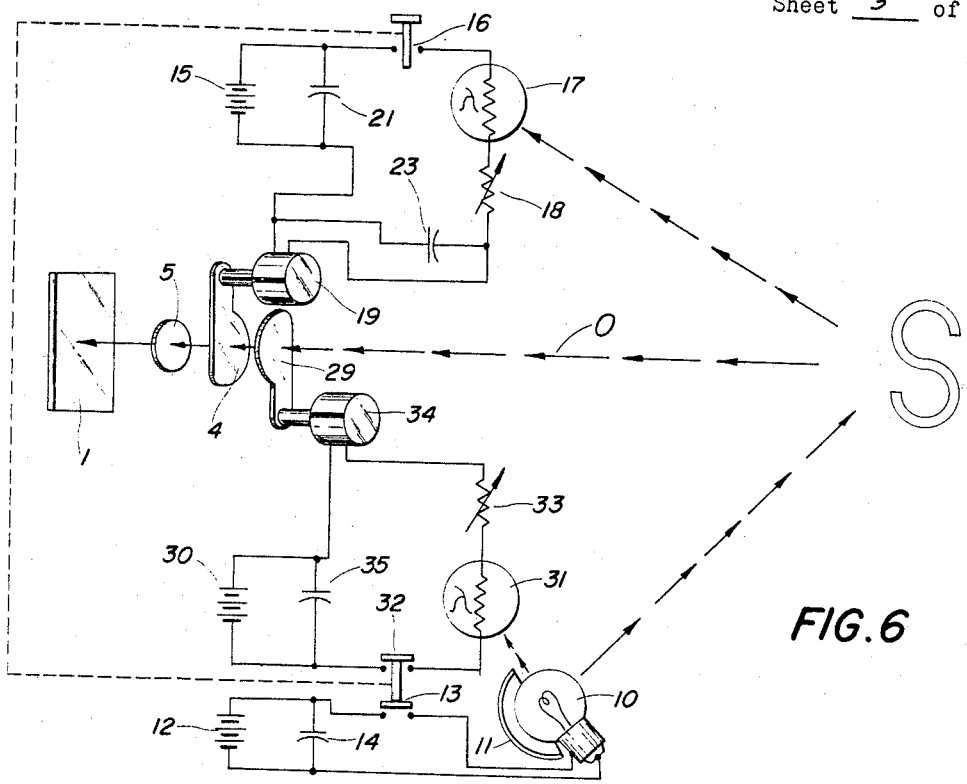
FIG. 6 is a schematic wiring diagram of a second embodiment of the invention.

In the alternative embodiment shown in FIG. 6, a second or additional light controlled shutter arrangement is provided in order to determine the time at which film exposure is commenced. In this case, a second light responsive shutter blade 29 is arranged in its nonenergization position to be normally closed, i.e., covering the exposure aperture. The light responsive closure shutter 4 and associated circuit operate in the same manner as shown in FIGS. 1 and 2. Control of the additional shutter blade 29 is accomplished by a series circuit arrangement including a source of electrical potential 30, a second photoresistive or light response device 31 preferably directed toward the position of a flash lamp 10 in the flash mechanism 9, a circuit activating switch 32, a variable resistor 33 and an exposure meter measuring instrument 34 having a moving coil on which the shutter blade 29 is mounted for movement therewith. A capacitor 35 is provided in this circuit also to ensure a rapid opening of shutter blade 29 whenever a predetermined energization level is reached. Switches 13, 16 and 32 are all mechanically interconnected so that they may be closed in timed relationship with the opening of a typical mechanical shutter (as in FIG. 1).

Operation of a camera embodying this arrangement can be accomplished by opening the typical mechanical shutter (as in FIG. 1), which will cause switches 13, 16 and 32 to be closed. When flash lamp 10 is fired, the light therefrom reaches the photocell 31. When a predetermined light intensity (and corresponding low photocell resistance) is reached, sufficient current will pass through the measuring instrument 34 to cause shutter blade 29 to be opened and commence exposure of the film 1. Referring again to FIG. 3, exposure commencement for this embodiment is shown by the line 36 in relation to the flash lamp output curve 25, curve 26 again corresponding to the mechanical shutter duration.

Completion of the film exposure is accomplished in the same manner shown with respect to FIGS. 1 and 2, by operation of the closure shutter 4 when a predetermined light reflected from the subject S reaches the photocell 17.

Variable resistor 33 in the normally closed light responsive shutter circuit may be used for factory calibration, or it can be accessible for adjustment to provide shutter opening according to particular flash lamp light output curves. Similarly, adjustment of resistor 33 may be interlinked with adjustment of variable resistor 18 to provide a similar light output characteristic adjustment for resistor 18.

Thus, it can be seen that exposure with flash operation may be accomplished independently of any mechanical timing arrangements, thereby eliminating, for example, improper exposures because of delayed flash lamp firings.

Figure 7:
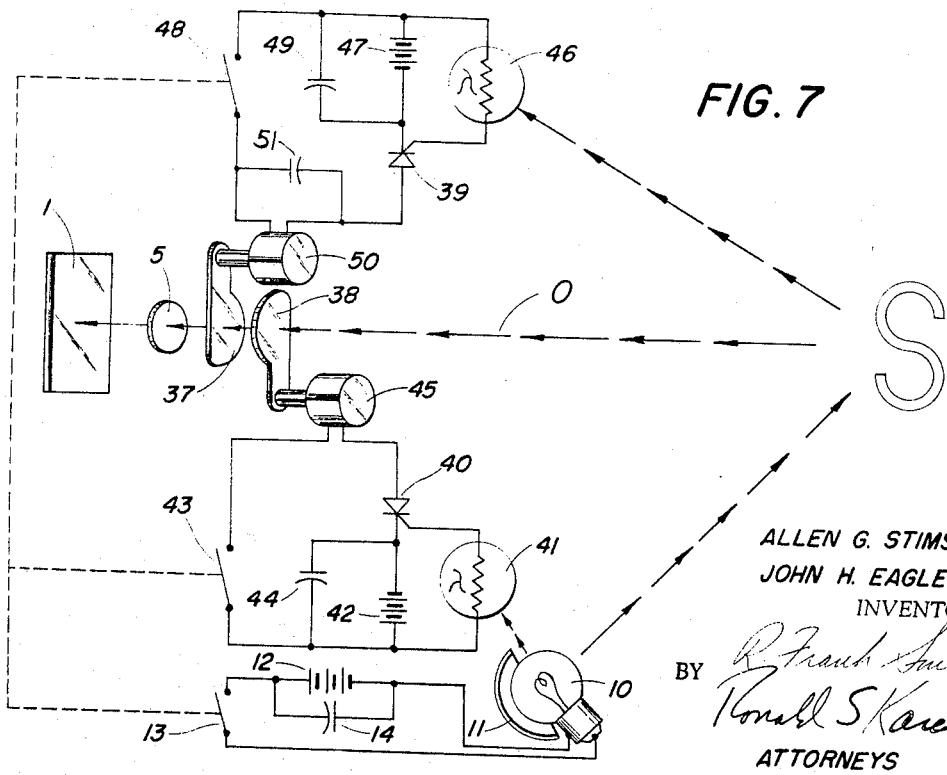
FIG. 7 is a schematic diagram of yet another embodiment of the invention.

The embodiment in FIG. 7 operates in like manner as that shown in FIG. 6, but control is accomplished by means of electrical circuits utilizing solid state switches 39 and 40 such as silicon controlled switches to control shutter blade action in response to the respective photocells.

In this embodiment, normally closed shutter blade 38 is controlled by the triggering of the silicon controlled switch 40 in response to a gating current input determined by the resistance of a photocell 41 directed toward flash lamp 10. Switch 40 is normally in a nonconducting state and is triggered to a conducting state when a predetermined light reaches the photocell 41. In series electrically with the switch 40 is a source of electrical potential 42, a manual circuit activating switch 43, and an electrical moving coil measuring instrument 45. Again a capacitor 44 is provided to ensure a minimum resistance circuit at operation time.

Exposure is terminated when sufficient light reaches photocell 46, thereby triggering the switch 39 from a nonconducting to a conducting state. Switch 39 is similarly in a series circuit with electrical potential source 47, switch 48 and an electrical moving coil instrument 50. A circuit charging capacitor 49 is also provided as above, as is a second or integrating capacitor 51. The closure shutter 4 is operated as soon as "closed" switch 39 permits sufficient current to pass through the instrument 50.

Switch 13, 43 and 48 are all shown to be mechanically interlinked as in FIG. 6 to enable them to be closed in timed relationship with a usual mechanical shutter actuator as in FIG. 1. Variable resistors may also be provided, as before, to make adjustment for exposure factors and flash lamp types.

Of course, while the invention has been described with respect to particular embodiments, variation can be resorted to without departing from the spirit of the invention or the scope of the subjoined claims.

We claim:

1. In a camera having means defining an exposure aperture for exposing photosensitive film, the combination comprising:

first shutter means normally closing the exposure aperture, and means to open the first shutter means to commence exposure;

means for receiving and firing a flash lamp in timed relationship with the first shutter opening means;

a photosensitive element illuminatable by scene light and reflected light from the fired flash lamp;

second normally open shutter means responsive to the illuminated photosensitive element to close the exposure aperture when total scene and reflected light reach a predetermined minimum value, said second shutter means comprising a moving coil permanent magnet galvanometer in circuit with the photosensitive element and a closure blade operably coupled with the coil, the closure blade moving in response to total light only when the predetermined minimum value has been reached; and a capacitor in circuit with said galvanometer operable to provide a rapid movement of the coil thereof at the predetermined minimum light level.

2. The combination according to claim 1 wherein the first shutter opening means comprises a light responsive circuit directed toward and responsive to the lighted flash lamp.

3. The combination according to claim 2 wherein the first shutter means comprises a second moving member galvanometer and an opening blade normally closing the exposure aperture and mounted for movement with the second moving member.

4. The combination according to claim 1 wherein the closure blade defines a cutout overlying the exposure aperture.

References Cited

UNITED STATES PATENTS

| | | | |
|---|---|---|---|
| 2,179,717 | 11/1939 | Fedotoff | 95—10 XR |
| 3,020,816 | 2/1962 | Frenk | 95—10 XR |
| 3,056,341 | 10/1962 | Grey | 95—10 XR |
| 3,059,526 | 10/1962 | Girard | 95—10 XR |
| 3,165,989 | 1/1965 | Kiper | 95—64 XR |
| 3,200,723 | 8/1965 | Topaz | 95—10 |
| 3,295,429 | 1/1967 | Stimson | 95—10 XR |

NORTON ANSHER, *Primary Examiner.*

JOSEPH F. PETERS, Jr., *Assistant Examiner.*

U.S. Cl. X.R.

95—11.5, 53, 64